(12) United States Patent
Shaffer et al.

(10) Patent No.: US 6,351,526 B1
(45) Date of Patent: Feb. 26, 2002

(54) DIALING PROCESS FOR IP TELEPHONY

(75) Inventors: Shmuel Shaffer, Palo Alto; William J. Beyda, Cupertino, both of CA (US)

(73) Assignee: Siemens Information and Communication Networks Inc., Boca Raton, FL (US)

( * ) Notice: Subject to any disclaimer, the term of this patent is extended or adjusted under 35 U.S.C. 154(b) by 0 days.

(21) Appl. No.: 09/265,485

(22) Filed: Mar. 9, 1999

(51) Int. Cl.[7] .......................... H04M 3/42; H04M 7/00; H04L 12/66; H04L 12/28; H04L 12/56

(52) U.S. Cl. .................. 379/201.01; 370/356; 370/401; 370/902; 370/908; 379/234; 379/900

(58) Field of Search .............................. 370/352, 356, 370/401, 467, 902, 908; 379/201.01, 219, 220.01, 234, 900; 455/401

(56) References Cited

U.S. PATENT DOCUMENTS

| | | | | |
|---|---|---|---|---|
| 5,341,374 A | * | 8/1994 | Lewen et al. ................ | 370/450 |
| 5,636,218 A | | 6/1997 | Ishikawa et al. ............. | 370/401 |
| 6,275,574 B1 | * | 8/2001 | Oran ....................... | 370/352 X |

FOREIGN PATENT DOCUMENTS

| | | | | |
|---|---|---|---|---|
| GB | 2 343 587 | 5/2000 | ............ | H04Q/7/20 |
| WO | WO 99/57921 | 11/1999 | ............ | H04Q/7/20 |

* cited by examiner

Primary Examiner—Harry S. Hong

(57) ABSTRACT

A system and a method for communicating dialed digits between a communication device and a call processor during call setup include transmitting at least the first digit of a telephone number from the communication device to the call processor within a first data packet. The call processor references a dialing plan to determine if the first data packet provides sufficient digits to complete the requested call. If not, the call processor determines the minimum quantity of digits required under the dialing plan to determine the destination of the call and transmits a protocol command to the communication device to transmit the minimum quantity of digits to the call processor within a subsequent data packet. The call processor continues to reference the dialing plan to determine whether additional digits are required and to request additional packets until sufficient packets have been received to establish the call. In an alternative embodiment, the call processor responds to identification of a variable-length telephone number by enabling a timer in the communication device. After being enabled, the timer is reset each time a user enters a subsequent digit. Upon expiration of a predetermined time interval either after the user has entered a previous digit or after the timer was enabled, the communication device transmits any digits the user has entered after enablement of the timer to the call processor within a subsequent data packet. The call processor attempts to establish the call utilizing digits received before and after enablement of the timer.

20 Claims, 3 Drawing Sheets

DIALING PROCESS FOR IP TELEPHONY

BACKGROUND OF THE INVENTION

The present invention relates to a system and a method for establishing telephone calls and, more specifically, to an improved system and method for dialing during call setup.

DESCRIPTION OF THE RELATED ARTS

In making a call to an analog Public Switch Telephone Network (PSTN), a caller enters a sequence of digits of a telephone number after receiving a dial tone from the central office. Typically, the caller depresses keys on the telephone to generate Dual Tone Multi-Frequency (DTMF) tones, each of which represents one of the digits of the telephone number. The DTMF tones are transmitted to a local central office, one at a time, until the local central office has received a sufficient number of digits to put the call through to the called party. For example, once the local central office receives the seven digits of a local call over a first local loop, it connects the caller to the called party via a second local loop. On the other hand, if the called party resides outside of the area of the local central office, the DTMF tones generated by the caller will indicate to the local central office that the called party is connected to a remote central office. Signaling in conventional analog telephony is performed on the same channel that carries voice information.

In an Integrated Services Digital Network (ISDN), a Basic-Rate Interface (BRI) provides a caller with two B-channels which are utilized to carry digitized voice and data, while a single D-channel is utilized for signaling and low speed data transmission. A Primary-Rate Interface (PRI) provides a higher bandwidth service for business users. The PRI consists of either twenty-three or thirty B-channels for user data and a single D-channel for signaling. During call setup, the digits which represent the telephone number of the called party are transmitted over the D-channel to be processed by a local central office. As in an analog telephone network, the digits are transmitted to the central office one at a time. In contrast to signaling on the analog telephone network, each digit is assembled into a data packet to be transmitted over the D-channel which is reserved for signaling.

The dialing process over wireless communication networks operates differently from the dialing process in conventional land-based digital and analog telephone networks. A base station is maintained by a cellular service provider to link cellular telephones with a land-based telephone network. When a caller makes a call from a cellular telephone, the caller locally enters the digits representing the telephone number into a cellular telephone. When the caller has entered the digits of the entire telephone number, the caller depresses a send key on the cellular telephone to transmit the digits of the telephone number to the base station. If the cellular telephone service is a digital service, the digits might be transmitted within a single data packet to the base station.

In recent years, techniques for performing voice communication over data networks, such as Local Area Networks (LAN), have developed into a viable option to conventional analog and digital telephony. Telephony-over-LAN (ToL) employs a dialing process which is similar to the process utilized by wireless communication networks. When a caller wants to make a call, the caller locally enters the digits of the called telephone into a ToL terminal. When the caller has completed entering the telephone number, the caller clicks on a dial icon on the ToL terminal screen to have the telephone number transmitted to a gatekeeper or some other device for call processing. The digits of the telephone number are assembled into a single data packet to be processed by the gatekeeper. Requiring the caller to click on the dial icon for each call can be inconvenient for the caller. As an alternative, each digit can be assembled into a separate data packet, with each data packet being transmitted separately to the gatekeeper. However, individually transmitting each digit is an inefficient use of limited network bandwidth. Furthermore, separately transmitting each digit increases processor requirements during call setup in the gatekeeper.

What is needed is a system and method which balance the need for a convenient dialing procedure with the need to conserve network bandwidth and/or call processing resources.

SUMMARY OF THE INVENTION

A method and a system for communicating dialed digits for a telephone number during setup of a call include analyzing at least one digit of a telephone number received from a communication device within a discrete unit of data to determine a first minimum quantity of additional digits required to determine a destination of the call. If additional digits are required, the communication device is requested to transmit the minimum quantity of digits within a subsequent discrete data unit and the call is established upon receipt of the additional digits, if they are sufficient to establish the call. The steps of analyzing digits received from the communication device within subsequent discrete data units and requesting additional digits within subsequent discrete data units are repeated until a sufficient quantity of digits has been received to complete the call.

In a preferred embodiment, the method and system are practiced within a packet-based data network, such as a LAN. The communication device includes a dialer which is responsive to user inputs to assemble a first data packet which includes at least a first digit of a telephone number. For example, if the caller dials the entire sequence of digits which comprises the telephone number, the dialer might integrate only the first digit in the sequence into the first data packet. After the first data packet has been transmitted, the dialer responds to protocol commands received from a call processor by assembling subsequent data packets which include additional digits of the telephone number and by transmitting the subsequent data packets to the call processor. Each subsequent packet includes a minimum quantity of additional telephone number digits which is specified by a protocol command.

The call processor includes dialing plan software which initiates responses to receipt of each first data packet and each subsequent data packet by determining a minimum additional quantity of digits required to establish a telephone call. The call processor transmits protocol commands to the communication device if additional digits are required. The protocol commands instruct the dialer to assemble the minimum quantity of additional digits into the subsequent packets for transmission to the call processor. A call setup subsystem establishes the call upon receiving a sequence of digits that is sufficiently complete to establish the call.

In the preferred embodiment, the dialing plan software references a dialing plan to determine if any additional digits are necessary. For example, if the first data packet includes a single digit which is "0," and according to the dialing plan the digit "0" provides access to an internal operator, then no additional digits are required to complete the call. In this case, the call setup subsystem establishes the call upon receipt of the first data packet.

By referencing the dialing plan, the dialing plan software is able to determine whether digits included in subsequent data packets are indicative of a long distance or a local external call request, a call request to a remote device via a private line such as a leased line, or an internal call request. As an alternative to storing the dialing plan at the call processor, the dialing plan can be downloaded in its entirety or it can be partially downloaded from the call processor.

If the dialing plan software concludes that a call request has an indeterminate digit sequence length, an alternate procedure is employed, because the dialing plan software will be unable to determine when it has the entire digit sequence for the telephone number. An example of this situation is where the dialing plan includes international telephone numbers of variable lengths. In this case, the call processor enables a timer in the communication device which is reset upon entry of each digit of the telephone number within a predetermined time interval after the timer is enabled or is reset. If the predetermined time interval elapses either after the timer has been enabled or the user has entered a digit, the dialer assumes that the user has finished dialing and, if any digits have been entered since the timer was enabled, the dialer assembles a data packet of the dialed digits into a single data packet for transmission to the call processor. If the user did not completely dial the entire telephone number prior to expiration of the time interval, the dialer is responsive to user inputs to enable DTMF emulation to allow the caller to finish dialing.

DETAILED DESCRIPTION

Figure 1:
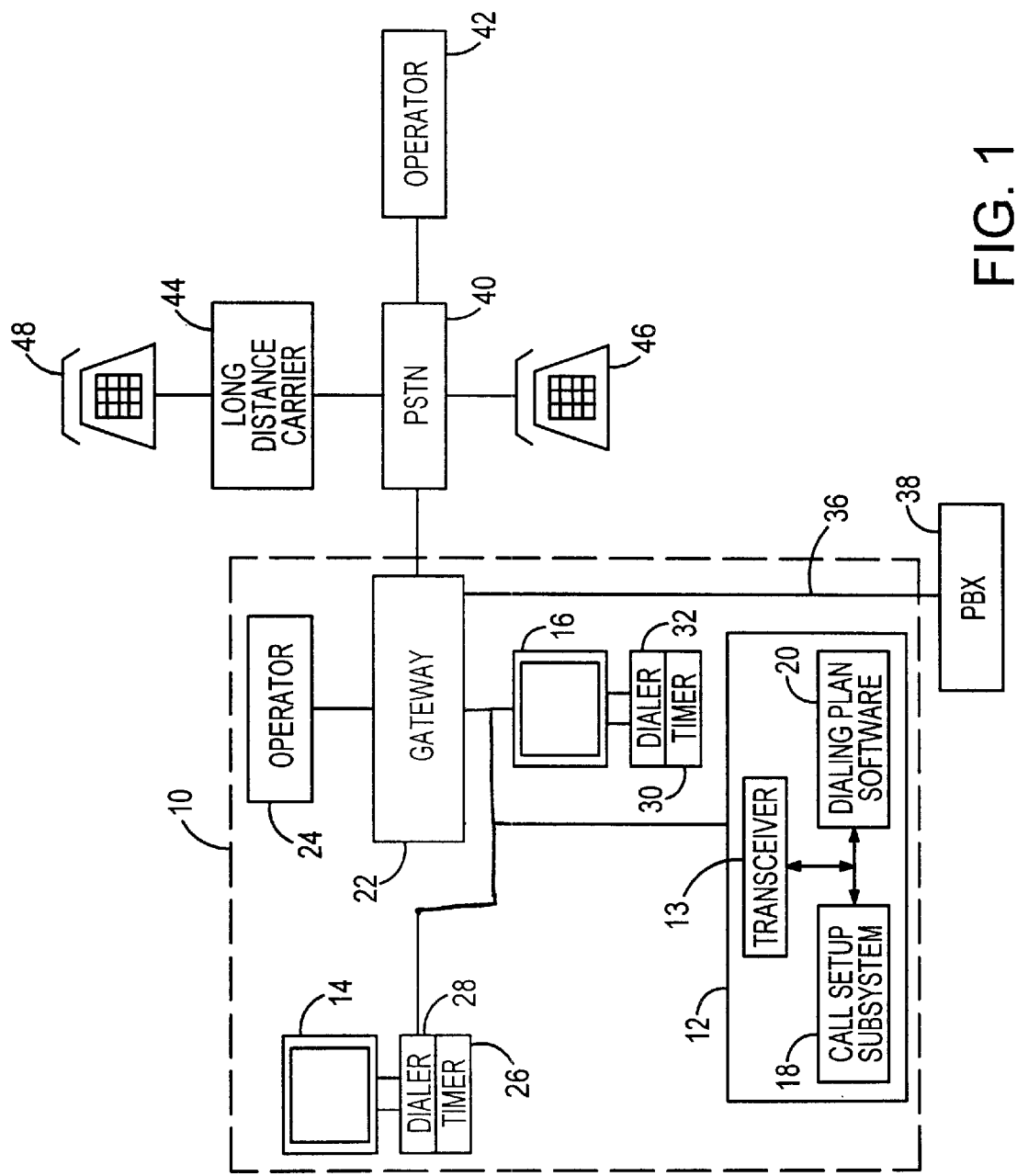
FIG. 1 is a high level schematic diagram of a communications network in which the present invention is practiced.

With reference to FIG. 1, a telephony-enabled data network, such as a Local Area Network (LAN) 10, includes a gatekeeper 12 which provides call processing functions for the LAN, including performing address translation. In a preferred embodiment, the gatekeeper conforms to the H.323 standard for line transmission of non-telephone signals promulgated by the International Telecommunications Union (ITU). The gatekeeper includes a transceiver 13, dialing plan software 20, and a call setup subsystem 18. The function of the gatekeeper can alternatively be performed within a dialing plan server (not shown) or a gateway 22. Terminals located on the LAN 10 include a first terminal 14, a second terminal 16, and an internal operator terminal 24. The gateway 22 provides an interface between the LAN 10 and a Public Switch Telephone Network (PSTN) 40, and between the LAN 10 and a Private Branch Exchange (PBX) 38. The LAN 10 and the PBX 38 are connected via leased lines 36. The gateway 22 performs analog-to-digital and digital-to-analog conversions and numerous other functions to ensure compatibility of multiple features between the LAN 10 and the PSTN 40 and between the LAN 10 and the PBX 38, as specified in the ITU H.323 standard. Telephony-enabled devices on the LAN 10 have access to a long distance carrier 44, a PSTN operator 42, and numerous communication devices, such as a first telephone 46 and a second telephone 48.

Two related concerns affect the selection of a dialing process for establishing calls through the gatekeeper 12 on the LAN 10. The first is the bandwidth required to transmit the digits of a telephone number to the gatekeeper 12, and the second is how the digit transmission protocol affects processing demands on the gatekeeper 12. Transmitting the digits one at a time in separate data packets results in wasted bandwidth as compared to transmitting all of the digits for a phone number within a single data packet. Likewise, requiring a CPU (not shown) of the gatekeeper 12 to process each digit as a separate interrupt results in inefficient utilization of gatekeeper processing resources. A solution which is typically implemented in the prior art involves locally storing user-generated digits at a calling terminal and transmitting the dialed digits to the gatekeeper 12 when the user clicks on a dial icon on the terminal screen or depresses a send key. However, it is desirable to allow the user to dial a telephone number in the same manner as is performed on a conventional PSTN telephone, so that the user need not click the dial icon or depress the send key. The dialing process of the present invention facilitates such a dialing process, while making efficient use of network bandwidth and gatekeeper processing resources.

Still referring to FIG. 1, the first and second terminals 14 and 16 include dialers 28 and 32 which respond to user inputs by selectively organizing the dialed digits into data packets and transmitting the data packets to the dialing plan software 20 on the gatekeeper 12. The terminals further include timers 26 and 30 which are enabled by the dialing plan software 20. As will be described in greater detail below, the timers 26 and 30 are utilized for an alternative dialing process for indeterminate-length telephone numbers, such as international telephone numbers. The dialing plan software 20 analyzes the content of each data packet received from one of the dialers (e.g., the first terminal dialer 28), to determine the minimum number of additional digits required to establish a call. The determination of the minimum number of additional required digits is made with reference to a dialing plan which is preferably stored at the gatekeeper 12. Although the dialing plan can be located at each ToL terminal, the fact that the dialing plan is likely to be modified over time makes it more practical to centrally locate the dialing plan at the gatekeeper 12. The exchange of dialed digits from the ToL terminals 14 and 16 is governed by a dialing plan protocol executed by the gatekeeper 12 and the ToL terminals 14 and 16.

After analyzing digits of each received data packet to determine the minimum number of additional digits that are required, the dialing plan software 20 transmits protocol commands to the first terminal dialer 28 to transmit the limited additional digits. The first terminal dialer 28 responds to each protocol command by assembling the designated minimum number of required digits into a single packet and transmitting the packet to the dialing plan software 20. The dialing plan software 20 continues to analyze received digits to determine minimum quantities of additionally required digits and to request the additional digits until the dialing plan software 20 has determined that it has received a sufficient number of digits to establish a call. A call setup subsystem 18 within the gatekeeper 12 establishes the call when the sufficient quantity of digits has been received. By intelligently collecting dialed digits from the ToL terminals 14 and 16 utilizing the minimum number of data packets, the present invention eliminates the need for users to click the dial icon to establish a call, while at the same time conserving network bandwidth and gatekeeper processing resources.

Although the preferred embodiment of the invention is implemented within a LAN environment, the invention can also be implemented within other network environments, such as within cellular telephone networks to eliminate the need for a send key on cellular telephones, or within traditional network switches, such as PSTN central offices and PBXs to increase call processing efficiency within the dialing process.

To provide a specific implementation which illustrates the operation of the invention, the following dialing plan is assumed. In order to make an external call outside of the LAN 10, a user must first dial "9" and then enter the telephone number of the called party. External telephone numbers can be one, three, seven, or eleven digits long. In order to place a call through the PBX 38 via the leased lines 36, the user must first dial "8" and then enter a four-digit extension number of the called party. Internal calls are four-digit extension numbers starting with the digit "2" and thus made by first dialing the digit "2" followed by three additional digits. To access the internal operator terminal 24, the user first dials "0." The above-described dialing plan provides only one example of a dialing plan implemented by the invention. The particular dialing plan implemented is not critical to the invention.

Figure 2:
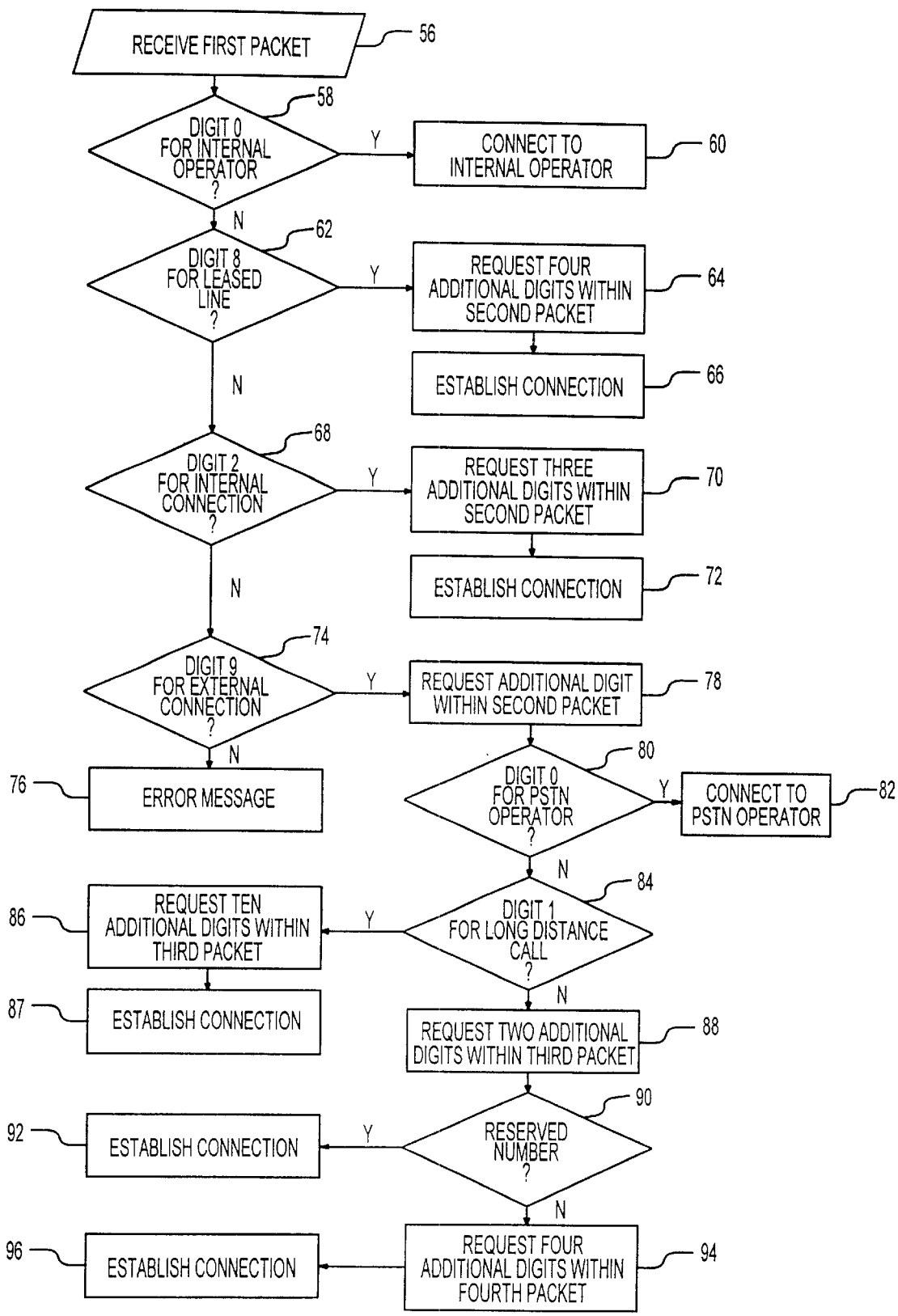
FIG. 2 is a preferred embodiment of a process flow for a dialing method within the network shown in FIG. 1.

Referring to FIGS. 1 and 2, a dialing process which implements the above-described dialing plan includes the step 56 of receiving a dialed digit from a calling terminal, such as the first terminal 14, within a first data packet. The dialer 28 of the first terminal selects the minimum quantity of digits which is sufficient to establish a call and assembles the digits into the first data packet. In this case, a single digit is the minimum quantity of digits because the digit "0" is sufficient to connect the user to the internal operator. In the preferred embodiment, the first data packet is a new H.323 partial number protocol element PNX, where "PN" identifies the data packet as a partial number and "X" identifies the quantity of the digits and the specific identity of those digits. Although in the above-described dialing plan the first protocol element always includes a single digit, other dialing plans are possible in which the first partial number protocol element includes multiple digits. If the first data packet includes the digit "9," the partial number protocol element arrives at the gatekeeper 12 as PN1:9, where "PN" identifies the data packet as a partial number protocol element, the "1" in the next field identifies the quantity of digits as being one, and the "9" in the next field identifies the digit as being the number "9."

Upon receiving the first partial number protocol element, the dialing plan software 20 at the gatekeeper 12 determines the first digit of the dialed telephone number. At step 58, the dialing plan software determines whether the digit is "0." If the first protocol element is PN10, the dialing plan software references the dialing plan and determines that the call is directed to the internal operator and that no further digits are required. At step 60, the call setup subsystem 18 establishes a call to the internal operator terminal 24.

At step 62, the dialing plan software 20 determines whether the first dialed digit is "8," which indicates that a call is to be directed over the leased line 36. If the first dialed digit is "8," the dialing plan dictates that four additional digits are required to complete the call. As a result, the dialing plan software 20 transmits a collect partial number protocol element (CPNX) to the first terminal dialer 28. "CPN" indicates that the protocol element is a collect partial number protocol element and "X" indicates the quantity of digits which is required. At step 64, the dialing plan software 20 transmits a CPN4 protocol element to the first terminal dialer 28. Upon receiving the CPN4 protocol element, the first terminal dialer 28 assembles the remaining four digits of the telephone number into a second partial number protocol element (PN4:abcd, where a, b, c, and d are the values of the four digits) to be transmitted to the gatekeeper 12. The call setup subsystem then establishes the call via the leased line 36 at step 66. By implementing the dialing process of the present invention, only two data packets are required to establish the call over the leased line, as opposed to five data packets if each digit were transmitted separately. Furthermore, the caller is not required to click a dial button or depress a send key.

At step 68, the dialing plan software determines whether the first dialed number is the digit "2" indicating an internal call. Under the dialing plan, internal calls begin with a "2" and are four digits long. In response to a PN12 which is received as the first partial number protocol element, the dialing plan software 20 transmits a CPN3 to the first terminal 14 at step 70 to request an additional three digits to complete the internal call. Upon receiving the three additional digits within a second partial number protocol element (PN3:mno, where m, n and o are the values of the three digits), the call setup subsystem 18 establishes the internal call at step 72.

At step 74, the dialing plan software 20 determines whether the first dialed digit is a "9" for an external call. If the first dialed digit is not "0," "8," "2," or "9," the dialing plan software does not recognize the first dialed digit as being part of the dialing plan and the caller will receive an error message at step 76. For example, the error message might indicate that the caller must first dial a "9" in order to make an outside call. Under the dialing plan, a number for an external call can be one digit long (0 for the operator), three digits long ("911" for emergency assistance), seven digits long (local call) or eleven digits long (long distance call). The dialing plan software 20 requests the minimum additional digits which are required to establish the external call from the first terminal 14. At step 78, the dialing plan software transmits a CPN1 protocol element to the first terminal. In response, the dialer 28 of the first terminal 14 assembles a second partial number protocol element which includes the first digit of the external telephone number. At step 80, the dialing plan software 20 determines whether the first digit of the external telephone number is "0" and, if it is, at step 82 the call setup sub-system 20 establishes a call to the operator 42 via the PSTN 40.

At step 84, the dialing plan software 20 determines whether the second dialed digit is "1" for a long distance call. If the second dialed digit is "1," the dialing plan software transmits a CPN10 protocol element requesting the remaining ten digits of the long distance telephone number from the first terminal 14 at step 86. Upon receiving the final ten digits of the long distance telephone number in the protocol element (PN10:qrstuvwxyz, where q, r, s, t, u, v, w, x, y and z are the values of the ten digits), the call setup subsystem cooperates with the long distance service carrier at step 87 to establish the long distance call. If the second dialed digit is determined in step 84 to be a "4,"1 "6," or "9," in step 88 the dialing plan software requests two additional digits to be transmitted within a third partial number protocol element to determine, at step 90, whether the call is for a reserved number such as "411," "611," or "911." If the second partial number protocol element indicates that the call is for a reserved number, at step 92 the call setup subsystem establishes the call. If step 90 reveals that the call is not for a reserved number, then it is assumed that the call is a local call and, at step 94, the dialing plan software 20 requests the final four digits to be transmitted within a fourth partial number protocol element. Upon receiving the final four digits, the call setup subsystem 18 establishes the call at step 96.

As an alternative to locating the dialing plan at a central location like the gatekeeper 12, the dialing plan can be downloaded to each ToL terminal 14 and 16. In this alternative embodiment, the ToL terminals 14 and 16 are equipped with dialing plan software 20 which locally determines when a sufficient quantity of digits has been entered to enable completion of a call. When the dialing plan software 20 determines that a sufficient quantity of digits has been entered by the user, the dialer 28 or 32 transmits the limited number of digits of the telephone number within a single data packet to the gatekeeper. An advantage provided by this alternative embodiment is that it requires little network bandwidth, because all dialed digits are transmitted to the gatekeeper 12 within a single data packet. However, locating the dialing plan within each ToL terminal can be impractical because, if the dialing plan is fairly complex, each terminal must be provided with a sufficiently powerful processor to run the dialing plan software 20 and enough memory to store the dialing plan and the dialing plan software 20, which can be prohibitively expensive. Furthermore, each time the dialing plan is changed, each terminal must be updated.

In another alternative embodiment, the dialing plan is partially downloaded to one of the ToL terminals, for instance the first ToL terminal 14, when it logs in with the gatekeeper 12. For example, the gatekeeper might upload the first step of the dialing plan so that the first ToL terminal 14 has the information that if the first dialed digit is "8," then four additional digits should be included in the first packet, if the first dialed digit is "2," then three additional digits should be included, and if the first dialed digit is "9," then only one additional digit should be included. After receiving the additional digit after the digit "9," the gatekeeper 12 determines what is the relevant remaining portion of the dialing plan and downloads the remaining relevant portion of the dialing plan to the first ToL terminal 14. The first ToL terminal is able to utilize the downloaded remaining portion of the dialing plan to include all of the remaining digits for the external telephone number into a single packet. The downloaded portion of the dialing plan can be either saved for future use by the first ToL terminal 14, or purged after each call and downloaded again upon logging onto the gatekeeper 12 for the next call.

Figure 3:
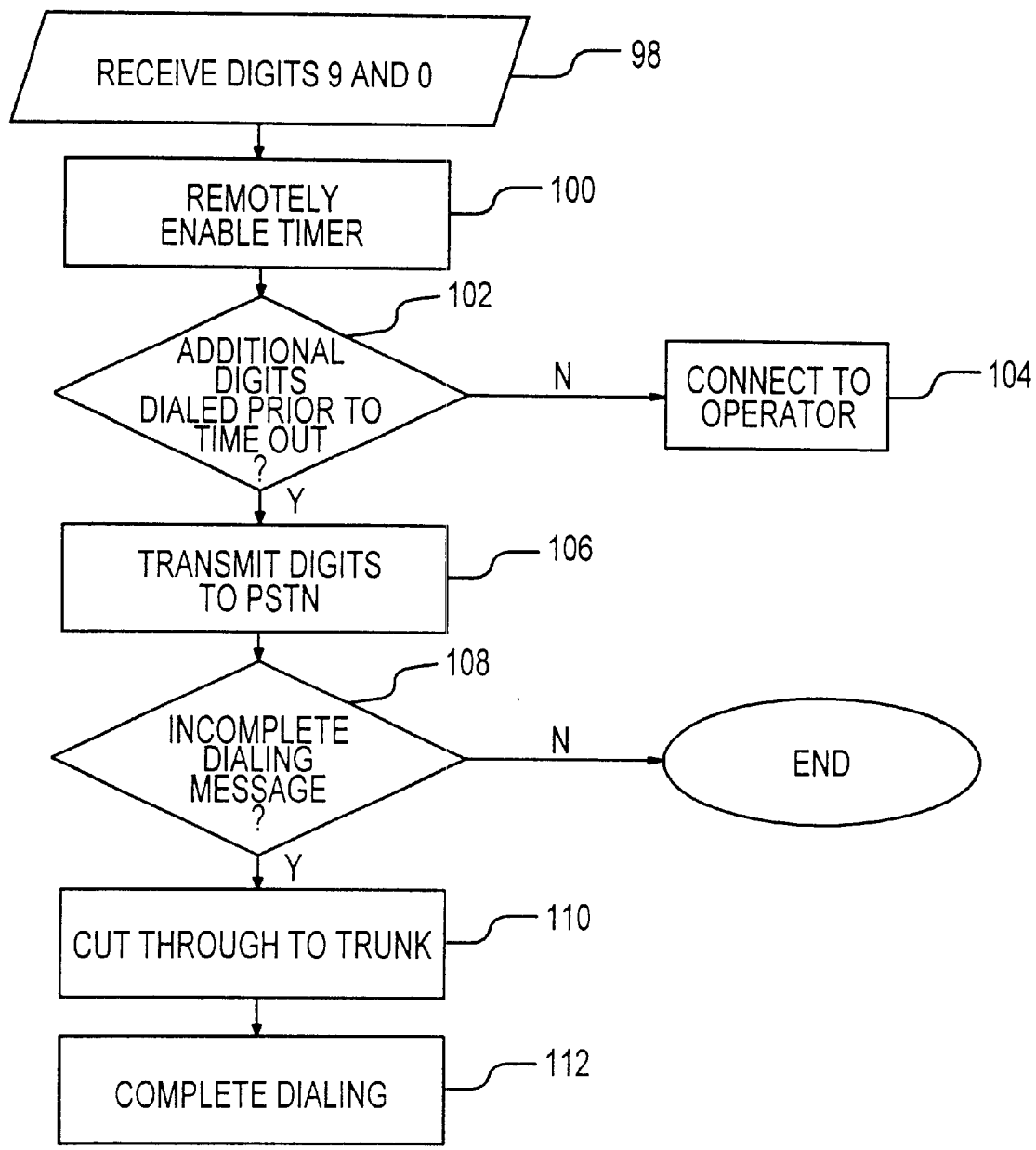
FIG. 3 is an alternative embodiment of the dialing method shown in FIG. 2.

The dialing plan can include telephone numbers, such as international numbers, which are of a variable length, so that the dialing plan software 20 is unable to determine what constitutes a sufficient quantity of digits to complete the call. An alternative dialing procedure is executed for these variable-length telephone numbers. With reference to FIGS. 1 and 3, at step 98 the dialing plan software 20 determines that a call is an external call as a result of receiving "9" and "0" as the first two dialed digits. The dialing plan software 20 assumes that the call is either directed to the PSTN operator 42 or it is a variable-length international call.

In response to receiving the digits "9" and "0" as the first two dialed digits, the gatekeeper 12 remotely enables the timer 26 within the calling terminal, for instance the first terminal 14, at step 100. The timer 26 is configured to time out at a predetermined time interval after being enabled, for example, after three seconds. The timer 26 is reset each time a user enters a digit for a telephone number. When the timer 26 times out, it is assumed that the caller has completed dialing the number. Then, the first terminal dialer 28 determines at step 102 whether the user has dialed any digits in addition to "9" and "0." If no additional digits have been dialed, at step 104 the call setup subsystem 18 establishes a call to the PSTN operator 42. On the other hand, if the user has entered additional digits after dialing "9" and "0," when the timer 26 times out, those digits are assembled by the dialer 28 into a partial number protocol element and the protocol element is transmitted to the gatekeeper 12. At step 106, the call setup subsystem 20 cooperates with the gateway 22 to transmit the dialed digits to a central office (not shown) of the PSTN 40.

One concern in utilizing a time-out system in the dialing process is that the timer 26 may time out prior to the user entering all of the digits for an international number. To address this concern, the user is alerted when the timer has expired. If the user has not finished dialing when he or she is alerted of the time-out, the user transmits an incomplete dialing message to the gatekeeper 12. The call gatekeeper 12 monitors for the incomplete dialing message at step 108. At step 110, if the gatekeeper receives an incomplete dialing message, the first terminal 14 is connected via the gateway 22 to a trunk line which the gateway has seized to the PSTN central office. The first terminal 14 generates signaling data which is required to complete the call, which the gateway 22 converts to the proper format for transmission over the PSTN 40. The gateway 22 transmits the formatted signaling information to the PSTN at step 112 to complete the dialing process.

What is claimed is:

1. A method for communicating dialed digits of a telephone number during setup of a telephone call from a first network comprising the steps of:
   (a) receiving at least one digit of said telephone number within a discrete unit of data;
   (b) analyzing said at least one digit to determine a minimum quantity of additional digits required to determine a destination of said call; and
   (c) requesting said minimum quantity of digits to be transmitted within a subsequent discrete data unit if said minimum quantity is greater than zero.

2. The method of claim 1 further comprising the following steps:
   (d) if said minimum quantity of digits is requested in step (c), receiving at least one digit that is received within a subsequent discrete data unit as a response to said request; and
   (e) repeating steps (b)–(d) until a sufficient quantity of digits has been received to determine said destination of said call.

3. The method of claim 1 wherein step (b) includes referencing a dialing plan to determine said minimum quantity of digits required to complete said call.

4. The method of claim 1 wherein step (b) includes determining whether said telephone call is directed to a second network which is separate from said first network.

5. The method of claim 4 wherein step (b) includes analyzing said minimum quantity of digits to determine whether said telephone call is a long distance call or a local call.

6. The method of claim 1 wherein said step of analyzing said at least one digit includes determining whether said telephone call is to be established via a private line to a remote communication device, said step of requesting said minimum quantity of digits including requesting a quantity of digits required for completing said private line call.

7. The method of claim 1 wherein said step of analyzing said at least one digit includes determining whether said telephone call is an internal call within said first network, said step of requesting said minimum quantity of digits including requesting a quantity of digits required to complete said internal call.

8. The method of claim 1 wherein said step of analyzing said at least one digit includes determining whether said call is directed to an internal operator within said first network.

9. The method of claim 1 wherein said step of analyzing said at least one digit includes ascertaining whether said telephone number has an indeterminate number of digits, the method further comprising the steps of:

storing a sequence of digits within a dialing device until a predetermined time interval has expired since the last digit in said sequence has been entered, said storing being performed if it is determined that said telephone number has an indeterminate number of digits; and transmitting said sequence of digits to a call processing device within said subsequent discrete data unit upon expiration of said predetermined time interval.

10. A system for efficient dialing during setup for outgoing calls comprising:

a first communication device having a dialer responsive to user input to generate a first data packet which includes at least a first digit of a telephone number for connectivity of an outgoing call, said dialer being responsive to protocol commands to assemble subsequent data packets to selectively include subsequent digits of said telephone number; and a call processor connected to said first communication device to exchange call-setup information, said call processor including:

(1) dialing plan software responsive to receipt of said first data packet and each subsequent data packet to determine minimum quantities of additional digits required to establish a call;

(2) means in communication with said dialing plan software for transmitting protocol commands to said communication device which include directions to assemble said minimum quantities of additional digits into said subsequent data packets for transmission to said call processor; and (3) means for establishing said call upon receiving a sequence of digits sufficient to determine a destination of said call.

11. The system of claim 10 wherein said dialing plan software includes a dialing plan descriptive of a probity of different types of calls, said dialing plan software being configured to determine said minimum quantities of additional digits according to said dialing plan.

12. The system of claim 10 wherein said dialing plan software is configured to recognize an internal call request to a remote device located on a common network with said first communication device, said transmitting means being configured to transmit a protocol command for a quantity of telephone number digits required for an internal call to said remote device to be assembled into a subsequent data packet.

13. The system of claim 10 wherein said dialing plan software is configured to distinguish between a different types of outside call requests, said types including local call requests and long distance call requests, transmission of particular ones of said protocol commands by said transmission means being selectively performed in response to detection of said local call requests and said long distance call requests.

14. The system of claim 10 wherein said dialer of said first communication device is responsive to a protocol command to enable a timer which is reset upon user input of each dialed digit, said dialer being configured to assemble a sequence of dialed digits into a subsequent data packet for transmission to said call processor upon expiration of a predetermined time interval after user input of a last digit in said sequence.

15. The system of claim 14 wherein said dialer is configured to generate required signaling data in response to user inputs to complete dialing of said telephone number when said predetermined time interval expires prior to a user completely dialing said telephone number.

16. The system of claim 14 wherein said dialer is configured to communicate an absence of dialed digits to said call processor if no digits are entered prior to said expiration of said predetermined time interval.

17. A method for improved dialing during setup of a call in a first communications network comprising the steps of:

receiving a call request which includes a first protocol element having a first sequence of at least one digit of a telephone number;

referencing a dialing plan to characterize said call request based on said first sequence, including determining whether said call request is associated with at least one of an external call outside of said first communications network, a call within said first communications network, a call over a leased line, and a call to an internal operator;

based on said characterization, requesting a first minimum quantity of digits to be transmitted within a second protocol element if additional digits are required to establish said call; and requesting a second minimum quantity of digits to be transmitted within a third protocol element if said first minimum quantity is not sufficient to establish said call.

18. The method of claim 17 wherein said step of referencing said dialing plan includes analyzing said first minimum quantity of digits to determine whether said call request is associated with one of a local external call and a long distance external call.

19. The method of claim 17 further comprising the steps of:

determining whether call request has an indeterminate number of digits required for completion of said call;

if said call request has said indeterminate number of required digits, enabling a timer within a calling device which generated said call request, said timer being reset upon user-entry of each digit of said telephone number into said calling device; and transmitting said second protocol element having a second sequence of digits from said calling device upon expiration of a predetermined time interval after user-entry of a final digit in said second sequence.

20. The method of claim 17 wherein said step of referencing said dialing plan includes downloading at least a portion of said dialing plan to a communication device which generated said call request.

* * * * *